No. 631,149. Patented Aug. 15, 1899.
A. BERGST.
REGULATOR FOR PUMPS.
(Application filed Apr. 7, 1898.)
(No Model.)

Witnesses:
Edward K. Allen.
Herbert Bradley.

Inventor:
Alphons Bergst.
By Knight Bros.
Attorneys.

UNITED STATES PATENT OFFICE.

ALPHONS BERGST, OF BERLIN, GERMANY.

REGULATOR FOR PUMPS.

SPECIFICATION forming part of Letters Patent No. 631,149, dated August 15, 1899.

Application filed April 7, 1898. Serial No. 676,806. (No model.)

*To all whom it may concern:*

Be it known that I, ALPHONS BERGST, a subject of the King of Prussia, German Emperor, and a resident of Berlin, in the Kingdom of Prussia and Empire of Germany, have invented certain new and useful Improvements in Regulators for Pumps; and I do hereby declare that the following is a full, clear, and exact description thereof, reference being had to the accompanying drawings, and to the letters of reference marked thereon, which form part of this specification.

The object of the invention submitted is an automatically-working regulator for pumps which purposes to diminish the influx of the generant power to the motor or completely to shut it off at the moment when the tension in the pressure-conveyance has overstepped a given maximum and again self-actingly to open it as soon as the tension in the pressure-conveyance has sunk.

Figure 1:
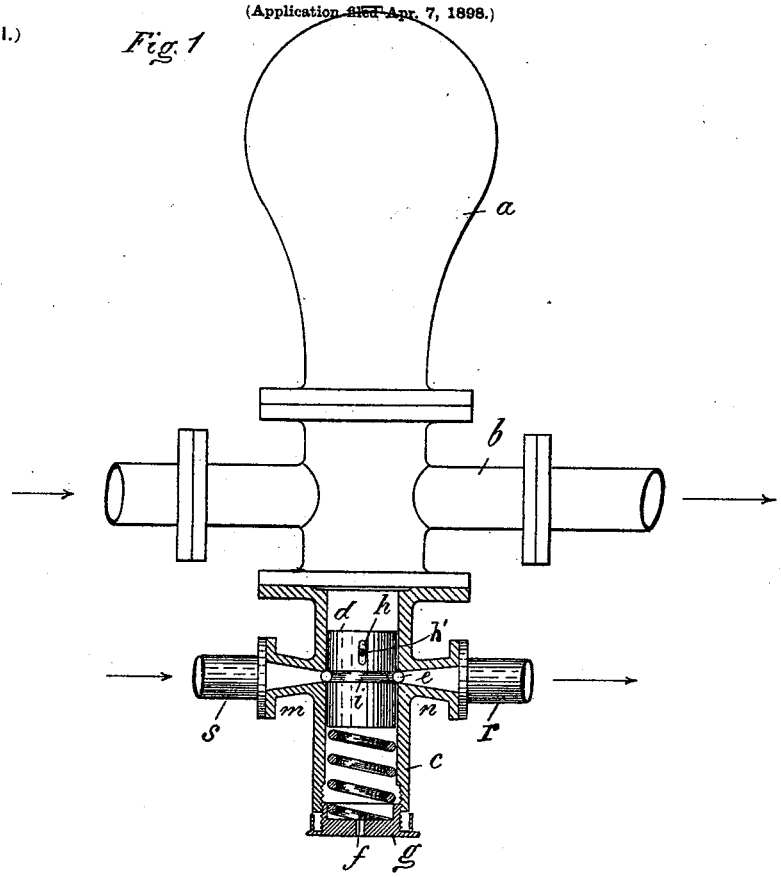
Figure 2:
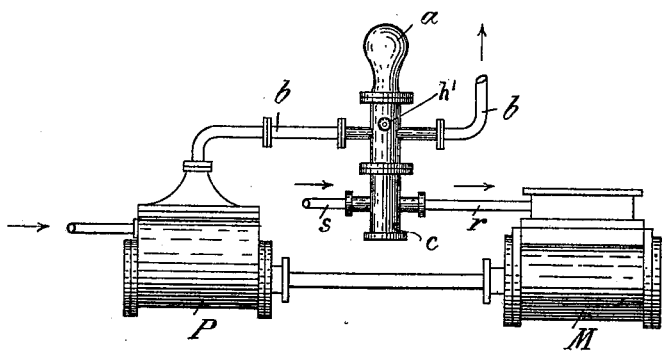

The accompanying drawings depict in Figure 1 the object of the invention in axial section. Fig. 2 shows the regulator in connection with a motor and pump.

A cylinder $c$, provided with an annular canal $e$, is connected up with a pressure-conveyance $b$, provided with a pump-kettle $a$ of the pump P and receives an axial movable closely-ground-in piston-slide $d$. This is suited at its circumference with an annular groove $i$, corresponding to the annular canal $e$. The movement of the piston-slide in the cylinder can be limited by an adjusting-screw $h'$, fitted in the latter, which interlocks in an axial groove $h$ of the piston-slide. The upper end of the piston-slide stands under the action of the press-water, while a spring $f$, set in the cylinder and capable of being controlled by the under cap $g$, presses against the lower end. Instead of the latter a lever under the influence of weights can be placed, which undertakes the control of the upward moving of the piston-slide.

Two tubular supports $m\ n$, mouthing into the canal $e$ and brought laterally onto the cylinder, fit onto the conduit $s\ r$, taking up the generant power for the motor M, which is connected with the pump P. The pressure-conveyance $b$ is connected with the pump, the conduit $s$ with the boiler or the compressed-air source, and the conduit $r$ with the motor driving the pump.

Should the pressure-conveyance be suddenly shut off or any other hindrance come in the way, so as to cause the admissible or fixed maximum tension in the conduit $b$ to be exceeded, then the piston-slide is pushed out of the appointed place so far down by the press-water as to partly or completely prevent the flow of the generant power from $s$ to $r$, whereby the speed of the motor and pump is diminished or both brought to a standstill. When the overtension in the pressure-conveyance has relaxed, the spring $f$ pushes the piston-slide back again, and the generant power can proceed from $s$ to $r$ and set the motor, as also the pump, gradually or with full speed in motion.

Having thus described my invention, what I therefore claim as new, and desire to secure by Letters Patent thereon, is—

1. The combination of the motor, the pump connected with the motor, the pressure-conveyance having a kettle and connected with the pump, the cylinder having tubular supports, the generant-power pipe connected with one tubular support, the generant-power pipe connected with the other tubular support and with the motor, a piston-slide having a groove connected with the tubular supports and located in the cylinder, beneath the kettle, and a controllable support for the piston-slide; substantially as described.

2. The combination of the motor, the pump connected with the motor, the pressure-conveyance having a kettle and connected with the pump, the cylinder having tubular supports and an annular canal, the generant-power pipe connected with one tubular support, the generant-power pipe connected with the other tubular support and with the motor, a piston-slide having an annular groove, located in the cylinder, beneath the kettle, and a controllable support for the piston-slide; substantially as described.

The foregoing specification signed at Berlin, Germany, this 16th day of March, 1898.

ALPHONS BERGST.

In presence of—
 CHAS. H. DAY,
 HENRY HASPER.